Oct. 30, 1934.                F. M. GUY                1,978,939
                          UNIVERSAL JOINT
                    Filed April 21, 1931       3 Sheets-Sheet 1

INVENTOR
Frederick M. Guy.
BY
ATTORNEY

Oct. 30, 1934.　　　　F. M. GUY　　　1,978,939
UNIVERSAL JOINT
Filed April 21, 1931　　3 Sheets-Sheet 2

INVENTOR
Frederick M. Guy.
BY Arthur M. Smith
ATTORNEY

Oct. 30, 1934.　　　　F. M. GUY　　　　1,978,939
UNIVERSAL JOINT
Filed April 21, 1931　　　3 Sheets-Sheet 3
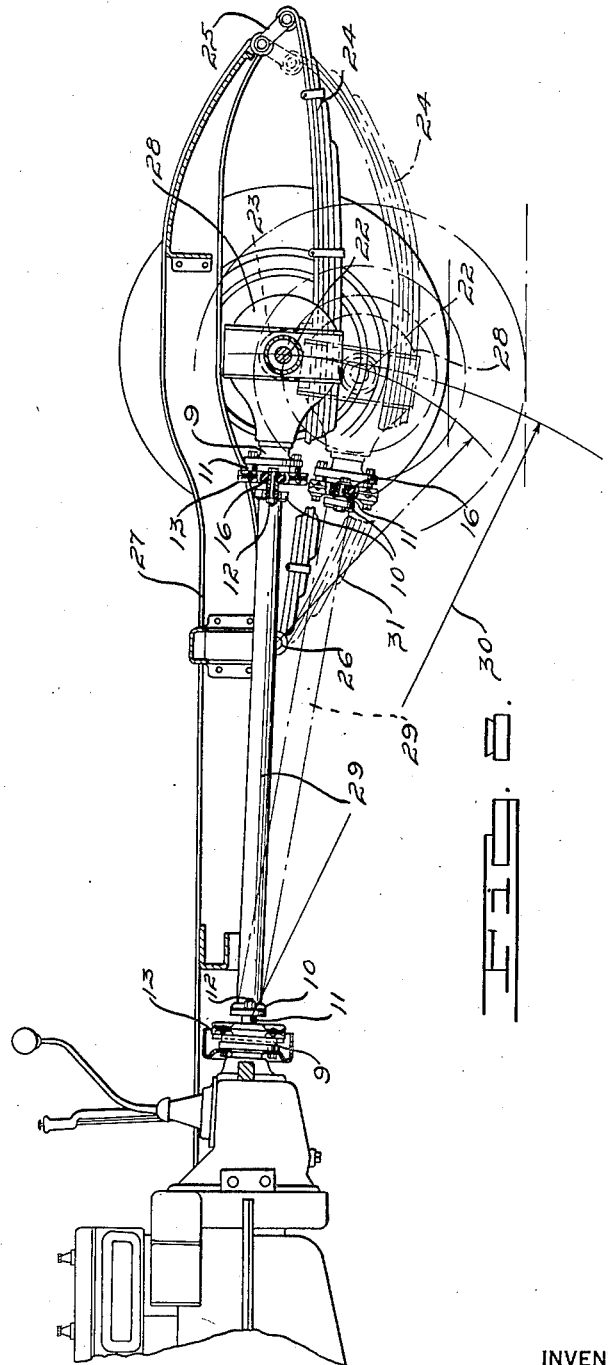
INVENTOR
Frederick M. Guy.
BY
ATTORNEY Patented Oct. 30, 1934

1,978,939

UNITED STATES PATENT OFFICE 1,978,939

UNIVERSAL JOINT

Frederick M. Guy, Detroit, Mich., assignor to Guy and Murton, Incorporated, Detroit, Mich., a corporation of Michigan Application April 21, 1931, Serial No. 531,818

27 Claims. (Cl. 64—96)

My invention relates to a universal joint and particularly to a universal joint in which resilient elements are interposed between the driving and driven shafts to provide a flexible driving connection between the shafts.

It is, therefore, an object of my present invention to provide a universal joint adapted for use in motor vehicle construction which provides for parallel, angular and longitudinal misalignment of the driving and driven shafts without the use of a spline.

It is another object of my present invention to provide a universal joint adapted for use in motor vehicle construction in which relative endwise movement between the driving and driven shafts is permitted without an excessive thrust load on the bearings in the joint.

It is a further object of my present invention to provide a universal joint adapted for use in motor vehicle construction in which power is transmitted through the joint with a minimum amount of power loss.

It is a further object of my present invention to provide a universal joint for use in motor vehicle construction which permits the propeller shaft to revolve on its own geometrical axis, thereby eliminating whipping of the shaft.

It is a further object of my present invention to provide a universal joint adapted for use in motor vehicle construction in which the friction of relatively moving parts and all metal-to-metal contacts are eliminated, whereby need for lubrication of the joint is avoided.

It is a further object of my present invention to provide a universal joint adapted for use in motor vehicle construction which provides a resilient driving connection in the power transmission system to absorb torque strains in the power transmission system and providing a yielding but sufficiently positive driving connection between the coupled shafts.

It is a further object of my present invention to provide a universal joint adapted for use in motor vehicle construction which is adapted to smooth out the unabsorbed power impulses transmitted to it from an internal combustion engine having a light flywheel, resulting in the elimination of much noise and wear in the attached parts.

It is a further object of my present invention to provide a universal joint for use in motor vehicle construction which eliminates transmission rattle and rear axle gear noises.

It is a further object of my present invention to provide a universal joint for use in motor vehicle construction in which excessive wear and deterioration of the resilient elements is prevented.

It is a further object of my present invention to provide a universal joint adapted for use in motor vehicle construction which is not affected by grit and dust during its operation.

It is a further object of my present invention to provide a universal joint adapted for use in motor vehicle construction in which there is no heating of the joint except that resulting from moderate and well distributed hysteresis in the resilient elements, which heat is so slight and so rapidly dissipated that no damage results from it.

It is a further object of my present invention to provide a universal joint adapted for use in motor vehicle construction in which there is no localized working in the resilient elements.

It is a further object of my present invention to provide a universal joint adapted for use in motor vehicle construction which is of simple construction and which eliminates the hazards of close manufacturing limits.

It is a further object of my present invention to provide a universal joint adapted for use in motor vehicle construction in which all parts are definitely centralized in a unitary carrier member resulting in a joint of balanced construction which runs true without friction or back lash during its operation.

It is a further object of my present invention to provide a universal joint adapted for use in motor vehicle construction which may be used to provide for extreme angles by the use of a minimum number of joints closely located in tandem.

These, and various other objects, features of arrangement, construction and operation, are plainly shown and described and will be best understood by reference to the accompanying drawings showing a preferred embodiment of my invention, in which:

Fig. 8 is a fragmentary side elevational view, partially in cross section, of a motor vehicle chassis showing universal joints embodying my invention attached to the propeller shaft of the vehicle.

Figures 1, 2:
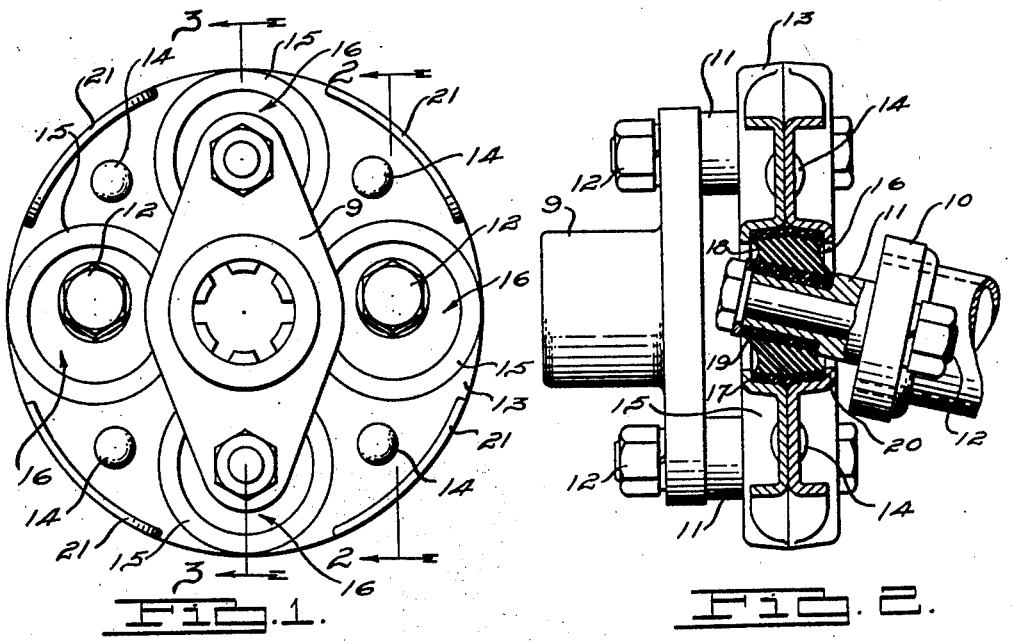
Fig. 1 is a plan view showing a universal joint embodying my invention.
Fig. 2 is a sectional view taken on the line 2—2 of Fig. 1.

Referring more in detail to the drawings, 9 designates a flange adapted for connection with a driving shaft, and 10 designates a flange adapted to be connected to a driven shaft. Secured to each of the flanges 9 and 10 are a plurality of members 11 which are secured to the respective flanges by bolts or similar means 12. Interposed between the flanges 9 and 10 is a carrier member 13 formed of two identical stampings and secured together by rivets or similar means 14. Each of the stampings forming the carrier member 13 is provided with depressed portions which form four flanged pockets 15 when the stampings are fastened together as shown. The flanged pockets 15 form receptacles for the resilient elements 16 and prevent displacement of the resilient elements 16 due to shocks or strains which pass through the flanges 9 or 10 to the resilient elements 16. The members 11 secured to the flanges 9 and 10 pass through the center of alternate resilient members 16, as shown in Fig. 1, and are secured positively to the center portion of the resilient member 16 by the bolts 12 and shoulders formed on the members 11.

Figure 6:
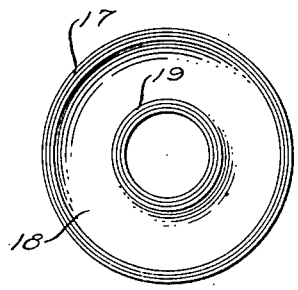
Fig. 6 is a plan view of one of the resilient elements incorporated in a universal joint embodying my invention.

The resilient block 16 is constructed with an outer shell 17 (Figs. 6 and 7), which is built up of a plurality of layers of fabric and rubber, to which is secured an intermediate rubber portion 18. A central core 19 is built up of a plurality of alternating layers of fabric and rubber or preferably wire cloth and rubber bonded together. The hole inside of the inner core 19 is of a slightly smaller diameter than the outside diameter of the member 11 which is to be inserted through the hole inside the core 19 in the final assembly. By this means I have found that it is possible not only to hold the member 11 very securely in the hole inside of the core 19 but also to develop a certain amount of initial compression in the intermediate rubber 18.

Likewise I have found that it is important to construct the outside shell 17 of an outside diameter which is definitely larger than the inside diameter of the pockets 15 in the carrier member 13 in which the members 16 are to be held. By the construction employed in the outer shell 17, the outer shell 17 is not rigid but is sufficiently compressible so that forcing it into the smaller pockets 15 in the member 13 likewise puts the intermediate rubber 18 of the block 16 under a very definite initial compression.

In order that the resilient blocks 16 may be flexed freely while held by the carrier member 13, the pockets 15 are open at each end and are provided with annular inturned flanges 20, which are of sufficient size to extend over each end of the outer shell 17 of the resilient members 16, and prevent displacement or slippage of the resilient members 16 during operation of the joint.

The stampings forming the carrier member 13 are provided with flanges 21, which tend to strengthen the construction and likewise afford additional radiating surfaces to expedite the dissipation of the slight amount of heat which would theoretically, at least, be developed due to hysteresis loss in the rubber of the blocks during operation of the joint.

This joint may be incorporated in a motor vehicle construction as shown in Fig. 8. The drawing shown in Fig. 8 illustrates a portion of a motor vehicle chassis of a conventional type employing what is known to those skilled in the art as the Hotchkiss drive. In this construction the rear axle 22 is secured by clips 23 to the spring 24, which is secured by a shackle member 25 and a pivoted member 26 to the frame 27 of the motor vehicle.

The axle stub shaft extends forwardly from the rear axle housing 28 and connects with a flange identical with the driving flange 9 (shown in Fig. 1). The driving flange 9 is secured by the members 11 to the resilient blocks 16 held by the carrier member 13. The propeller shaft 29 is provided at each end with flanges identical to the flanges 10 shown in Fig. 1, which likewise are connected by the members 11 with the resilient blocks 16 and respective carrier members 13. At the forward end of the propeller shaft 29 a flange identical to the flange 9 is secured to the power transmitting shaft extending rearwardly from the transmission and which in turn is connected through the resilient member 16 with the carrier member 13. In using a drive of the Hotchkiss type in motor vehicle construction it will be apparent that a certain amount of movement is permitted to the rear axle 22 by reason of the flexing of the spring 24 due to the operation of the motor vehicle. This action is shown in this view by the dotted line position of the parts. It will be observed that when the rear axle 22 occupies the position shown in the dotted line view that an end thrust due to the forward movement of the rear axle assembly is transmitted through the universal joint members secured to each end of the propeller shaft 29. This forward movement of the rear axle assembly is due to the fact that the spring 24 is pivotally mounted to the frame 27 by the pivotal connection 26 and by the shackle connection 25, the shackle connection 25 permitting a downward and forward movement of the spring 24 relative to the frame 27. As this movement takes place, the portion of the spring 24 extending forwardly of the axle 22 pivots about the point 26 but is not free to give under the thrust received and consequently causes the axle 22 to move slightly forward of the position normally occupied by it.

When the propeller shaft 29 is in the position shown in Fig. 8 a radius 30, taken from the center of the forward universal joint on the propeller shaft, centers on the axle 22 and intersects a radius 31 taken from the point of pivotal connection 26. When, however, the radius 31 describes an arc from the pivot point 26, which is followed by the axle in its downward and forward movement as above described, it no longer coincides with an arc of the radius 30, and the difference in distance between the two arcs at the end of the movement of the axle is the amount of relative longitudinal movement between the shafts which must be accommodated in some manner. In a device embodying my invention this movement is provided for in the universal joint itself without the use of a spline on the shaft.

Figure 3:
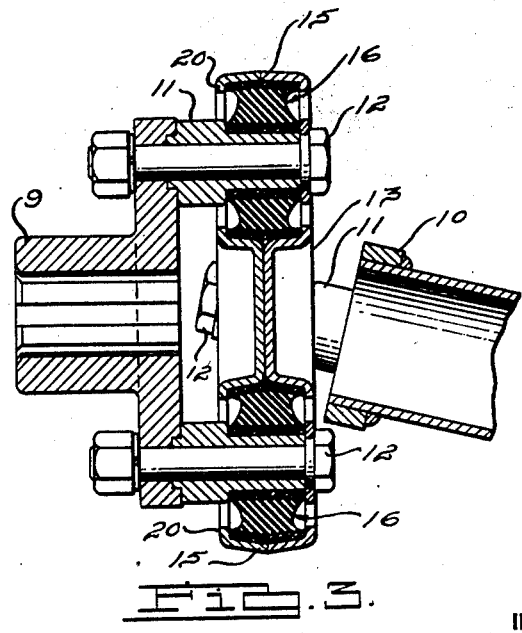
Fig. 3 is a sectional view taken on the line 3—3 of Fig. 1.
Figure 4:
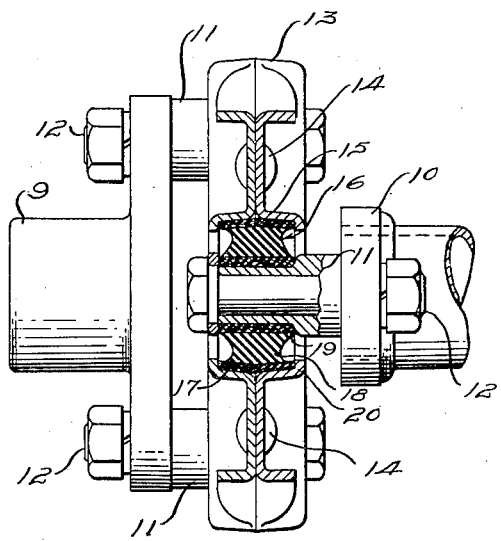
Fig. 4 is a side elevational view partially in cross section of a universal joint embodying my invention.

The operation of my invention is as follows: When the driving and driven shafts are perfectly aligned, as shown in Fig. 4, and the flanges 9 and 10 are secured to these shafts, the position of the resilient members 16 and the carrier member 13 are as there shown. At this stage the resilient members 16 are in a state of initial compression due to the assembly of the joint, but are not subjected to any strains tending to distort the members. When, however, the driven shaft to which the flange 10 is secured is angularly disposed to the driving shaft to which the flange 9 is secured, the position of the parts is as shown in Figs. 2 and 3. The resilient members 16 are distorted (mainly angularly), as shown in Fig. 2, due to the position assumed by the members 11 secured to the core 19, whereas, the resilient blocks 16 in which the members 11 secured to the driving flange 9 are mounted, (Fig. 3), are only slightly (mainly longitudinally) distorted.

Figure 5:
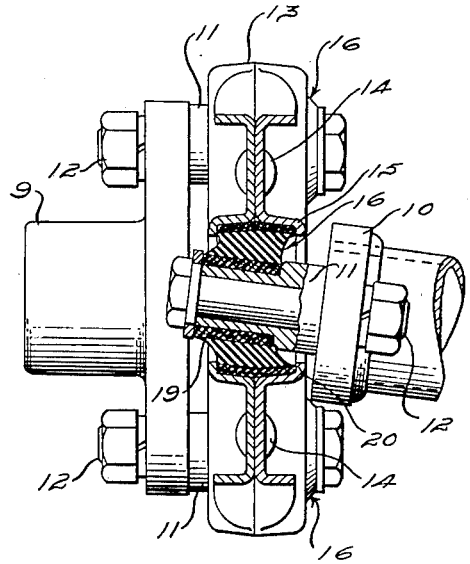
Fig. 5 is a side elevational view of the universal joint shown in Fig. 4, partially in cross section, showing the position of the parts to accommodate angular and longitudinal misalignment of the shafts.

As shown in Fig. 5, when the driving and driven shafts are angularly and longitudinally misaligned as to one another, the resilient elements 16 are so distorted as to provide for the angular and longitudinal misalignment of the shafts. In this case the center cores 19 of the resilient elements 16 are protruded by the members 11 secured to the driven flange 10 and by the members 11 secured to the driving flange 9. By this means the relative longitudinal misalignment between the shafts is absorbed by all of the resilient elements in both of the universal joints incorporated in the assembly shown in Fig. 8.

Figure 7:
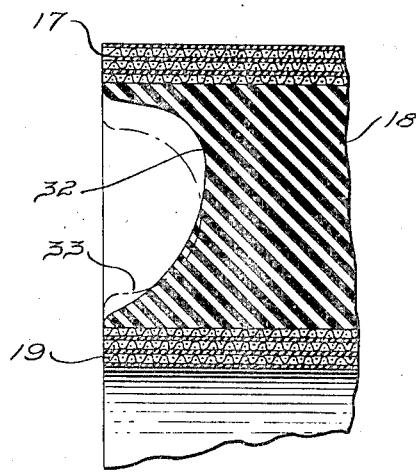
Fig. 7 is an enlarged fragmentary view in cross section of a portion of the resilient block incorporated in a universal joint embodying my invention.

In the designing of the universal joint embodying my invention it was found that the resilient elements 16 were most satisfactory when constructed with a circularly extending groove 32 in the rubber portion 18 between the core 19 and the shell 17. By the use of such a groove it was found that the rubber 18 was permitted to function more perfectly and to be freely extended or compressed during the operation of the universal joint without damage to the rubber. It was found, however, that in using a groove such as the groove 33 shown in the dotted line of Fig. 7, that the strains incident to the working of the rubber in the joint resulted in a rupture of the rubber at a point adjacent the inner core 19. It was found, however, that by developing a curve similar to the curve 32 shown in Fig. 7 that it was possible to eliminate the localization of working strains and secure a uniform working of the whole mass of rubber in the resilient elements 16. The curve as shown in Fig. 7 was developed so as to provide a substantially uniform amount of rubber at all points from the place where it was secured to the core 19 to the point of greatest depth in the groove 32 in the resilient material 18. In other words, the blocks are thicker at or near the cores 19 and thinner nearer their outer peripheries. This difference in thickness compensates for the differences in surface area on the increasing circumferences of the blocks.

Theoretically if the contour of the groove were to be extended it would extend indefinitely without the opposite surfaces of the grooves on the ends of the blocks intersecting. However, from the practical standpoint it is necessary to provide sufficient surface area to join the rubber securely to the outer shell 17. In order to do this, the groove 32 should be extended only so far as may be necessary to provide a sufficient quantity of rubber subjected to constant working to insure the successful operation of the structure without overworking the rubber in the blocks 16. If these practical limitations be observed, it is not difficult to secure an initial compression of the entire mass of rubber within the block in the manner previously described. Resilient blocks formed with circularly extending grooves of this type have been found to be practically free from highly localized working of the rubber in the blocks. All deformation or working of the rubber is distributed throughout a large part of the rubber forming the resilient element.

In a successful embodiment of my invention I have found that the rubber used in the resilient blocks is most satisfactory if compounded to resist permanent change from its original form. Such rubber is commonly termed "non-flowing" rubber. It is important to have high stress characteristics in the rubber in order to give the rubber the ability to carry extreme loads without taking a permanent set and to permit the rubber to return to its original form after the load has been released. A high resistance to strain quality in the rubber is very important because where strain appears on the tension side of the block it is necessary to provide against the fatigue or breaking of the rubber while it is being stretched. For a joint designed to carry loads up to 400 pounds per square inch on the rubber running at a constant angle of 6°, it has been found that a "non-flowing" rubber block, $2\frac{1}{8}''$ in diameter and $1\frac{1}{4}''$ thick, formed with rubber of 60 durometer hardness, has worked very satisfactorily. It is desirable, however, to vary the hardness of the rubber used for various installations and for the purposes of carrying particular loads, or elimination of certain vibrations. The particular rubber compound to be used is governed by the work which is to be done. It is essential, however, that the rubber compound used should retain its resiliency under all normal operating temperatures.

In the manufacture of the inner core 19, I have found that the most satisfactory core is made up of a plurality of layers of wire cloth, preferably brass cloth, because of the affinity of rubber for the brass and the more perfect bond which results from its use. By the use of this material it is possible to secure a large surface contact with the rubber and prevent the shearing of the rubber layers by relative movement between the layers of the wire cloth. I have found that a preferred construction employs three plys of woven brass cloth formed of #30 U. S. S. gauge woven twenty-four strands to the inch in each direction.

While fabric or cord impregnated with rubber may be used in building up the core 19, it has been found that the tensile strength of the wire in the core 19 gives a more satisfactory core for general use than if the core is built up of fabric or cord which has a lower tensile strength. Furthermore, for equal strength the wire cloth provides larger interstices, and these seem to be preferable insofar as adequate bonding of the rubber is concerned. The construction of the cores 19 should provide a core which is somewhat resilient and expansible, but which at the same time has sufficient rigidity to permit securing the members 11 to the core in such a manner as to prevent a relative movement between the members 11 and the cores 19. These resilient and expansible cores prevent relative movement between the rubber and the connecting member 11 which would cause an excess amount of heat, causing the resilient members to wear out rapidly and making the construction of such a joint very impractical.

In order to hold the resilient member 16 securely in the carrier member 13 it is necessary to provide an outer shell such as the outer shell 17, which permits confining the block securely within the carrier member 13 without relative movement between the resilient block 16 and the carrier member 13.

In the construction of the outer shell 17 I have found that a 10 or 12 ounce standard hose duck used in alternate layers with rubber is very satisfactory and gives a shell which may be forced into the pockets 15 in the carrier member 13, although it is possible to use a wire cloth similar to that above described for use in the construction of the inner cores 19. However, the method of securing the resilient member 16 in the carrier member 13 is such that the carrier member 13 protects the shell 17 so that it is not as necessary that the outer shell 17 have as much tensile strength as the inner core 19.

It is preferable in the construction of the outer shell 17 to make it compressible so as to permit of its more ready assembly in the carrier member and also in order to permit the use of a block having a definitely larger circumference than the inner circumferences of the pockets 15.

The providing of a compressible outer shell 17 and an expansible inner core 19 contributes to the prevention of slippage between the carrier member 13 and the outer shell 17 and the core 19 and the members 11.

The forcing of the resilient members 16 into the pockets 15, as above described, coupled with the expansion of the core 19 from the inside, builds up an initial compression in the rubber 18 of the resilient members 16. If the resilient blocks 16 should be incorporated in the universal joint without having been put under initial compression, then the transmission of forces would result not only in the compression of the rubber at some points but in stretching the rubber at other points. It has been found that any such repeated and positive stretching of the rubber soon results in its disintegration and failure. When, as previously explained, the rubber is subjected to an initial compression, then a large degree of deformation can occur without subjecting any part of the rubber to a positive stretch, such deformations being accommodated wholly by increasing or decreasing the degree of compression.

I have found that it is preferable to construct the carrier member 13 of two steel stampings, each having four pockets equally disposed at 90° to each other and having their centers equidistant from the center of the carrier member. Each of the two stampings is strengthened by the use of turned circumferential flanges which extend between the respective pockets and which tend also to increase the radiating surfaces of the stampings. All of the pockets in the carrier member 13 are in the same plane and are equidistantly spaced from and around a common axis. By this construction each of the resilient blocks 16 is definitely held in the carrier member 13 in fixed relation to the other members held in the carrier member 13 so that all driving and driven studs on the driving and driven shafts are definitely centered and held in their proper positions during operation of the shafts at any and every required angle. Such a carrier member permits the placing of the resilient elements in the carrier in such a way that all strains imposed upon the universal joint are distributed through all of the resilient members; for example, in the case of an end thrust where the propeller shaft assembly uses two universal joints, each pair of oppositely disposed blocks in each of the universal joints is subjected to a strain causing its extrusion to ¼ of the amount of the total relative endwise movement of the shafts. This is made possible only because of the fact that the resilient blocks 16 are so held in the carrier member 13 that the axes of the cores of the resilient blocks are at right angles to the respective faces of the carrier members and substantially parallel to the axes of the shafts which are connected through the universal joint.

In order to permit free circulation of the air around the resilient blocks 16 and also to permit the change in form of the blocks 16, both ends of the pockets 15 are open and provided with circumferential flanges 20. Without the use of the circumferential flanges 20, which grip the edges of the resilient members 16, the resilient members 16 would be displaced from the assembly upon end thrust from the connected shafts.

In the example of the universal joint of my invention heretofore referred to, designed to carry loads up to 400 pounds per square inch on each rubber and running at a constant angle of 6°, I have found that the carrier member 13 operates very satisfactorily if constructed of $\frac{3}{32}$ steel stampings having an overall diameter of 6". With these dimensions the centers of each of the pockets 15 are placed 1.906" from the center of the member and have a total inside depth of 1". The diameter of the open portion of the pockets 15 is surrounded by the circumferential flange 20 is 1¾" and the inside diameter of each of the pockets 15 is 1.968". Into this carrier member resilient members 16, having outside diameters of 2⅛", are placed. This forcing of this oversigned block into the pockets in the carrier member 13 acts to build up the compression in the rubber 18 as above described. The centers of each of the pockets 15 in the carrier member 13 are placed at equal distances from the common center of the carrier member and at right angles to each other.

It has been found that by utilizing two universal joints embodying my invention in the power transmission system shown in Fig. 8 that the propeller shaft 29 may be revolved at any desired speed without any objectionable whip. The same propeller shaft, when held in such a system by the conventional type of universal joint, has been found to whip or throw out to such a marked extent that it is impractical, if not dangerous, to operate the shaft at high speeds. It has also been observed that where the shaft 29 will run out of line when turned slowly, that when turned to a high speed and being mounted with universal joints embodying my invention at either end, such a shaft will tend to straighten itself out and practically eliminate the whip in the shaft and its tendency to run out of line.

This action appears to be due to the fact that in using a conventional type of universal joint the points of attachment of the intermediate shaft to the joints are essentially fixed rigid points and are not movable in a resilient medium as in universal joints embodying my invention. By permitting the slight movement of these points of attachment in a resilient medium, it is possible for the intermediate shaft to revolve on an axis the exact position of which is determined by forces within the shaft. In other words, the use of resilient bearings at the points of connection between the intermediate shaft and the universal joint permits the intermediate shaft to rotate on its own axis. Whereas, if these points are fixed as in the conventional construction, the intermediate shaft is forced to rotate on a fixed predetermined axis which is governed by the position of the fixed points of attachment to the universal joint.

It also is possible to attach two or more universal joints embodying my invention in close tandem relation to one another so as to provide for extreme angles in universal joint installations such as the power transmission systems in front wheel drive motor vehicles and the like.

From the construction shown it will be observed that there is at all times maintained a yielding driving connection between the driving and driven shafts through the resilient members 16 and that any wear or failure of the resilient members 16 to function properly will result merely in an imperfect operation of the joint but will not prevent the transmission of power through the shafts. In conventional types of universal joints, when the universal joint breaks down or the spline wears so that the parts slip out under severe shocks, the propeller shaft drops, preventing further operation of the motor vehicle until repairs are made, and endangering the safety of the occupants of the motor vehicle.

I have found that the hubs 10 and 11 are most satisfactorily formed of steel forgings and while other forms of construction may be employed, it is to be understood that this is the preferred form.

In tests which have been run with universal joints embodying my invention it has been found that the operation of the joint was perfectly smooth and without vibration where the angles between the shafts were as high as 16.3°. During its operation from no angle to the angle of 16.3° it was found that there was so little loss in power transmitted as to be practically negligible. It was also found that no perceptible heat was developed in the joint. As compared to the ordinary type of universal joint, it was found that it was not practical to operate the ordinary type of universal joint at an angle greater than about 6°, at which angle the joint was operating at 97.48% efficiency and developing excessive heat. It is believed that these results follow from the construction in which all driving connection between the driving and driven shafts is through the flexible rubber blocks 16 so held that the rubber which is nearly perfectly resilient is deformed in such a way that all of the work required to deform the rubber is restored to the system so that there is almost no loss due to the working of the rubber. There is, however, a slight loss due to the hysteresis in the rubber. This, however, in the construction which I have here shown, is for all practical purposes a negligible quantity and any heat which may result from such hysteresis is rapidly dissipated by the carrier member 13 and the movement of the entire joint through the air with all parts freely exposed.

It has been found that universal joints embodying my invention, when coupled between shafts the opposite ends of which are attached through gears to other shafts, tend to eliminate gear noises and the like and to keep the gears running in mesh at all times. This insures the elimination of much of the conventional gear noise in rear axles commonly used in motor vehicle construction, as well as the noises of the transmission gears.

While I have illustrated a preferred embodiment of my invention, many modifications may be made without departing from the spirit of the invention, and I do not wish to be limited to the precise details of construction as herein set forth, but desire to avail myself of all equivalents within the scope of the appended claims.

Having thus described my invention, what I claim is new and desire to secure by Letters Patent of the United States is:

1. A universal joint adapted to provide for angular, parallel, and longitudinal misalignment of connected shafts and including a flanged hub secured to the driving shaft, a second flanged hub secured to the driven shaft, studs secured to each of said flanged hubs and extending in the direction of the other hub on lines parallel to the axes of the hubs, a carrier member disposed between said flanged hubs, resilient members secured in a state of initial compression in fixed relation about the axis of said carrier member, means to prevent relative movement between said resilient members and said studs and to secure said studs to said resilient members whereby all relative movement of said shafts is accommodated by distortion in said resilient members, and means to prevent relative movement between said resilient members and the said carrier member.

2. In a universal joint, the combination of a driving hub and a driven hub adapted for mounting on a driving and driven shaft respectively, a flange formed on each of said hubs, a plurality of studs secured to each of said flanges at right angles to the faces of said flanges and extending in lines parallel to the axes of said hubs, a unitary carrier member disposed between the flanges on said driving and driven hubs and provided with a plurality of flanged pockets, a plurality of resilient members secured within said flanged pockets, and means for securing said studs to said resilient members.

3. In a universal joint, the combination of a driving member and a driven member, and a carrier member provided with a series of openings, resilient members secured within said openings, each of said resilient members including a resilient block having a spaced apart inner core and an outer shell and resilient material secured between the said inner core and the said outer shell, and means for securing the driving and driven members to said resilient members centrally of said openings and independently of said carrier member.

4. In a universal joint, the combination of a driving member and a driven member, and a carrier member provided with a series of openings, resilient members secured within said openings, each of said resilient members including a resilient block having a core and a shell spaced a distance apart, said core and said shell each comprising a plurality of layers of flexible material, resilient means interposed in the space between said core and said shell and secured to said core and said shell whereby said core and said shell are yieldingly held in their positions relative to one another, and means for securing the driving and driven members to the cores of said resilient members centrally of said openings and independently of said carrier member.

5. In a universal joint, the combination of a driving member and a driven member, and a carrier member provided with a series of openings, resilient members secured within said openings, each of said resilient members including a resilient block having a core, an opening in said core adapted to accommodate fastening means, a fabric shell spaced apart from and surrounding said core, a block of resilient rubber moulded between and secured to said core and said shell, a groove in each end of said block of rubber extending between said core and said shell on a line concentric to said core and within said shell, and means for securing the driving and driven members to said cores in said resilient members centrally of said openings and independently of said carrier member.

6. In a universal joint, the combination of a driving member and a driven member, and a carrier member provided with a series of openings, resilient members secured within said openings, each of said resilient members including a resilient block having a spaced apart inner core and a flexible outer shell, resilient material secured between the said inner core and said outer shell, and a groove in said resilient material extending between said core and said shell on a line concentric with said core and shell, said groove being of a varying depth throughout its width, and means for securing the driving and driven members to said resilient members centrally of said openings and independently of said carrier member.

7. In a universal joint, the combination of a driving member and a driven member, and a carrier member provided with a series of openings, resilient members secured within said openings, each of said resilient members including a resilient block having a spaced apart inner core and an outer shell, resilient material secured between the said inner core and said outer shell, and a depressed portion in each end of said resilient members between said core and said shell and extending concentrically with said core, said depressed portion being of a varying depth throughout its width, the deepest portion of said depressed portion being nearest said shell, and means for securing the driving and driven members to said resilient members centrally of said openings and independently of said carrier member.

8. In a universal joint, the combination of a driving member and a driven member, and a carrier member provided with a series of openings, resilient members secured within said openings, each of said resilient members including a resilient block having a spaced apart inner core and an outer shell and resilient material secured in the space between the said inner core and said outer shell, said resilient material being so placed between said inner core and said outer shell that the square inch surface area of the said resilient material in the said block is substantially uniform at all points where working occurs in said resilient material, and means for securing the driving and driven members to said resilient members centrally of said openings and independently of said carrier member.

9. In a universal joint, the combination of a driving member and a driven member, and a carrier member provided with a series of openings, resilient members secured within said openings, each of said resilient members including a resilient block having an outer shell and an inner core and resilient holding means interposed between the outer face of said core and the inner face of said shell, said core and said shell being formed of a yielding but less resilient material than said resilient holding means and of such lengths as to extend beyond the faces of said resilient holding means, and means for securing the driving and driven members to said cores in said resilient members.

10. In a universal joint, the combination of a driving member and a driven member each provided with laterally and oppositely extending arms, a carrier member having a plurality of flanged openings arranged about the axis of said carrier, yieldable blocks secured at their outer peripheries within said flanged openings and bolts passing through the ends of said arms and through central openings in said blocks for securing the arms to the blocks held in said carrier.

11. In a universal joint, the combination of a driving member and a driven member each provided with laterally and oppositely extending arms, a carrier member provided with a series of flanged cups arranged in spaced apart relation about the axis of the carrier, blocks of resilient material secured within said flanged cups by the flanges on said cups and yieldable centrally of said flanged cups, means for securing the ends of the arms of the driving member to certain of said blocks centrally of each block, and means for securing the ends of the arms of the driven member to the other of said blocks centrally of said openings in said blocks.

12. In a universal joint, the combination of a driving member and a driven member each formed with laterally and oppositely extending arms, a carrier member formed with a series of spaced apart openings, yieldable blocks secured in said openings, each block having a yieldable outer covering secured within said openings and each formed with a central opening and a yieldable portion surrounding said opening, and a more yieldable material than said yieldable outer covering and said portion surrounding said central opening secured to said yieldable outer covering and to said portion surrounding said central opening, and means extending through the central openings in said blocks for securing said arms to said blocks independently of said carrier.

13. In a universal joint, the combination of driving and driven members having laterally and oppositely extending arms, a carrier member interposed between said members and formed with a series of flanged cups arranged in spaced relation about the axis of the carrier, a series of resilient blocks held within said cups at the edge portions of the blocks, each block being formed with a central opening, a bushing in the central opening of each block, and means passing through said bushings for securing the ends of said arms to said bushings.

14. In a universal joint, the combination of a plurality of resilient rubber blocks each comprising a central yielding core, an outer yielding shell, and masses of rubber bonded between said cores and said shells; means for placing said rubber under an initial radial compression during assembly of the universal joint and including extending members for attaching a driving flange to the cores of certain of said blocks and extending members for attaching a driven flange to the cores of other of said blocks, said members acting to expand said cores, and a carrier member secured to the outer shells of each of said blocks.

15. In a coupling, the combination of a plurality of resilient rubber blocks, yielding means secured to said blocks to eliminate surface friction on the rubber of the blocks, extending members for attaching a driving shaft to said yielding means of certain of said blocks and extending members for attaching a driven shaft to said yielding means of other of said blocks, and a carrier member, said extending members and said carrier member cooperating to place the rubber of said blocks under initial radial compression during assembly of the coupling.

16. In a coupling, the combination of resilient rubber blocks secured in a unitary carrier member, yielding means secured to said blocks to eliminate surface friction on the rubber therein, means for attaching a driving shaft to said yielding means of certain of said blocks, means for attaching a driven shaft to said yielding means of other of said blocks, the said means and said carrier member cooperating to distort said yielding means and place the rubber in said blocks under initial radial compression during the assembly of the said coupling.

17. In a universal joint for connecting together a driving shaft and a driven shaft, the combination of a unitary carrier member, a plurality of resilient rubber blocks carried in said carrier member, means for rigidly attaching the driving shaft to the central portion of a plurality of said blocks, and means for rigidly attaching the driven shaft to the central portion of a plurality of different blocks, said blocks having their longitudinal axes extending longitudinally of said shafts.

18. In a universal joint, the combination of a driving member and a driven member and a carrier member provided with a series of openings, resilient members secured within said openings with their longitudinal axes extending on lines substantially parallel to the axis of said carrier member, each of said resilient members including a resilient block having a spaced apart inner core and an outer shell, resilient material secured between the said inner core and the said outer shell, and means for securing the driving and driven members to said resilient members centrally of said openings and independently of said carrier member.

19. In a universal joint adapted to connect a driving member and a driven member and including a carrier member provided with a series of openings therein, a resilient member secured within each of said openings, each of said resilient members including a block of resilient material, a flexible non-metallic core and a flexible non-metallic shell, means for securing the driving member to the cores of certain of said resilient members centrally of said openings and independently of said carrier member, and means for securing the driven member to the cores of other of said resilient members centrally of said openings and independently of said carrier member.

20. In a universal joint adapted to connect a driving member and a driven member and including members provided with laterally and oppositely extending arms adapted to be secured to the adjacent ends of a driving member and a driven member, a carrier member having a plurality of flanged openings arranged about its axis, yieldable blocks secured at their outer peripheries within said flanged openings, and means passing through the ends of said arms and through central openings in said blocks for securing said arms thereto.

21. A universal joint for connecting together a driving member and a driven member, comprising a cross head adapted to be secured to the end of each member and intersecting the axis thereof, a unitary floating member interposed between said cross heads and spaced longitudinally thereof, and resilient blocks yieldingly joining each cross head to said floating member at independent points disposed outwardly from the shaft axes and forming the driving connection between said heads to permit relative movement of said cross heads in any direction.

22. A universal joint for connecting together two endwise spaced apart relatively movable members, comprising a unitary rigid device spaced from said members and located adjacent the spaced ends thereof, resilient blocks for yieldingly connecting said members together solely through the medium of said device, the points of connection of one member through the medium of said device being different from the points of connection of the other member through the medium of said device, and said device being yieldingly supported by said members solely through the medium of said blocks.

23. A universal joint adapted to provide for angular, parallel and longitudinal misalignment of connected members and including a unitary carrier member adapted to be disposed between the adjacent ends of connected members, a series of resilient inserts secured in said carrier member with their longitudinal axes extending on lines substantially parallel to the longitudinal axes of the members connected therewith, and means connecting said members with said resilient inserts.

24. A universal joint for connecting together a driving member and a driven member, comprising a cross head adapted to be secured at the end of each member, a rigid carrier plate having a plurality of openings arranged about the axis thereof, resilient blocks secured within said flanged openings, and studs at the outer ends of said cross heads and extending through openings in said blocks for securing each cross head to said carrier.

25. A universal joint for connecting together a driving member and a driven member, comprising a cross head adapted to be secured at the end of each member, a unitary carrier having a plurality of openings arranged about the periphery thereof, resilient blocks secured within said openings, and studs at the outer ends of said cross heads and extending substantially parallel to the axis of the carrier through openings in said blocks for securing each cross head to said carrier.

26. A universal joint for connecting together a driving member and a driven member, comprising a cross head adapted to be secured at the end of each member, said cross heads extending substantially at right angles to each other, a unitary carrier having a plurality of openings arranged about its axis, resilient blocks secured within said openings, and studs at the outer ends of said cross heads and extending substantially parallel to the axis of the carrier through openings in said blocks for securing each cross head to said carrier.

27. In a universal joint adapted to connect a driving member and a driven member and including members provided with laterally and oppositely extending arms adapted to be secured to the adjacent ends of a driving member and a driven member, a carrier member having at least four openings arranged about its axis, yieldable blocks secured within said openings, and means passing through the ends of said arms and through central openings in said blocks for securing said arms thereto.

FREDERICK M. GUY.